United States Patent [19]

Kunoki

[11] Patent Number: 4,997,306
[45] Date of Patent: Mar. 5, 1991

[54] JOINT FOR REINFORCING BARS

[76] Inventor: Soichi Kunoki, 360, Rivergate Way, Sacramento, Calif. 95831

[21] Appl. No.: 539,549
[22] Filed: Jun. 18, 1990
[51] Int. Cl.⁵ ............................................. B25G 3/20
[52] U.S. Cl. ................................. 403/374; 403/314; 403/390
[58] Field of Search .............. 403/314, 393, 390, 374

[56] References Cited

U.S. PATENT DOCUMENTS 4,695,178  9/1987  Era et al. ..................... 403/314 X

FOREIGN PATENT DOCUMENTS 1401361  4/1965  France ........................... 403/390

Primary Examiner—Andrew V. Kundrat
Attorney, Agent, or Firm—Joseph C. Mason, Jr.; George B. Oujevolk

[57] ABSTRACT

In joint for connecting reinforcing bars (5 and 5) in such a manner that the connecting end portions of the reinforcing bars are respectively inserted into the respective curved portions of a hollow metallic pipe (sleeeve 1) from the opposite sides thereof, and a wedge 6 is press-fitted into the area between the reinforcing bars from one of the wedge bores 4 and 4' to the other, a joint having a concave portions 8 and 8' on the inner surface of the curved wall 3 and 3' at the inner surface of the arc center of the pair of curved walls of the sleeve.

4 Claims, 2 Drawing Sheets

JOINT FOR REINFORCING BARS

[BACKGROUND OF THE INVENTION]

This invention relates to an improvement of joint for connecting together reinforcing bars which is called clip joint and disclosed in U.S. Pat. No. 4,695,178.

A joint includes sleeve 1 which is a hollow metallic pipe and has an opening respectively at the two ends and wedge 6, as shown in FIG. 5 and FIG. 6. The sleeve is formed in such as manner that the outer and inner peripheries thereof both have nearly an oval cross section, and the wall thereof includes of a pair of side walls 2 and 2' which are plane walls provided substantially parallel with each other at a certain spacing and a pair of curved walls 3 and 3' which are convex with respective to the center of the sleeve and connect the said side walls respectively. Wedge bores 4 and 4' are provided in the respective centers of said side walls in such a manner as to be aligned each other.

In operation, the connecting end portions of the reinforcing bars 5 and 5' respectively inserted into the upper and lower curved portions of sleeve 1 from the opposite sides thereof, and the wedge 6 is press-fitted into the area between the reinforcing bars 5 and 5' from one of the the wedge bores (4' in the FIGS. 5 and 6) to the other (4 in the FIGS. 5 and 6). Pressure applied at this time is usually about 10 tons. In consequence, the reinforcing bar 5 is pressed against the lower inner surface of the curved wall while the reinforcing bar 5' is pressed against the other inner surface so that the reinforcing bars 5 and 5' are connected strongly by the joint. This completes the connection of the reinforcing bars. The sleeve is usually about 5 to 10 cm long.

When the wedge 6 is press-fitted, strong pressure is applied to the respective arc centers 7 and 7' of the curved wall of the sleeve by the reinforcing bars which respectively contact the acr centers 7 and 7'. The pressure is greatest at the portion corresponding to the wedge insertion position of the arc center (i.e. at the center of the arc center in the longitudinal direction). Because of it, the arc centers of the respective curved walls should be reinforced. A reinforcing means employed is to make the portion to be reinforced thicker than the other portions. However, for convenience in manufacturing of sleeves, the whole sleeve is made as thick as the said reinforced portion in many cases, resulting in increase in cost of joint for connecting reinforcing bars.

Application of tensile force to the reinforcing bars connected together by the clip joint produces rotational force with the wedge as the fulcrum so that the sleeve slants slightly with respect to the direction of the tensile force as shown in FIG. 4. As a result, each of the edges of the arc centers of the curved walls which is at the opening of the said sleeve contacts strongly with the reinforcing bar which is press-fitted to the respective curved wall. In consequence, as the reinforcing bars come out little by little from the sleeve by the tensile force, the inserted bars are scraped off by the said edges so that the sectional area of the reinforcing bars decreases. The reinforcing bars connected by clip joint suffers from such a problem as to have smaller tensile strength than that of reinforcing bars with no such loss of sectional area. In addition, strong stress is produced at the opening of the sleeve by the said contact, and therefore the said portion must be reinforced to result in cost increase.

[SUMMARY OF THE INVENTION]

It is an object of the present invention to provide a joint including a sleeve of structure which enables the reinforcing of the arc centers of the curved walls of the sleeve not to be required or to be greatly reduced.

It is another object of the present invention to provide a clip joint including a sleeve of structure, in addition to the above-described structure, which enables the reinforcing bar not to be scraped by the edge of the arc center of the curved wall or the scraping to be greatly reduced when tensile force is applied.

It is a further object of the present invention to reduce the pressure required to press-fit the wedge and to simplify the work and the equipment employed.

It is a further object of the present invention to provide a reinforcing bar connection method using a clip joint including a sleeve with the improved structure of that mentioned above.

[DESCRIPTION OF THE PREFERRED EMBODIMENTS]

Figure 1A:
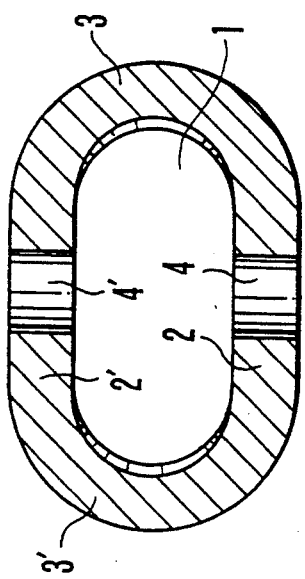
FIG. 1 (a) is a sectional view at A of the sleeve shown in FIG. 1 (b), which is a member of the joint for connecting reinforcing bars of this invention and FIG. 1 (b) is a front view thereof.
Figure 1B:
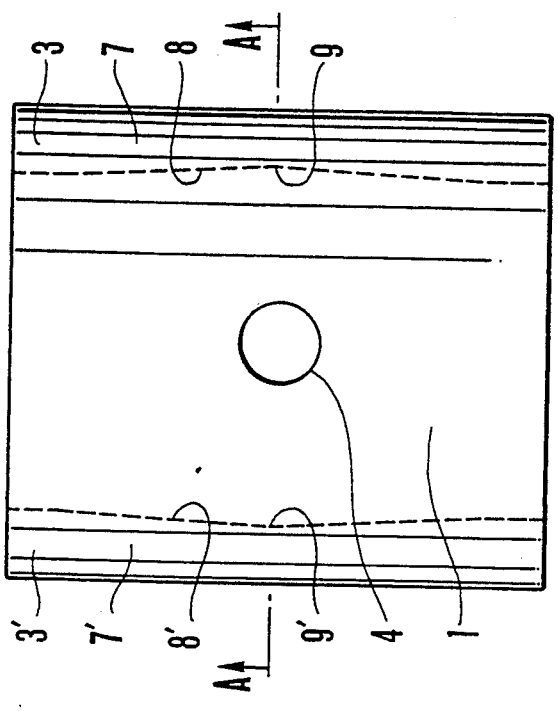
Figure 4:
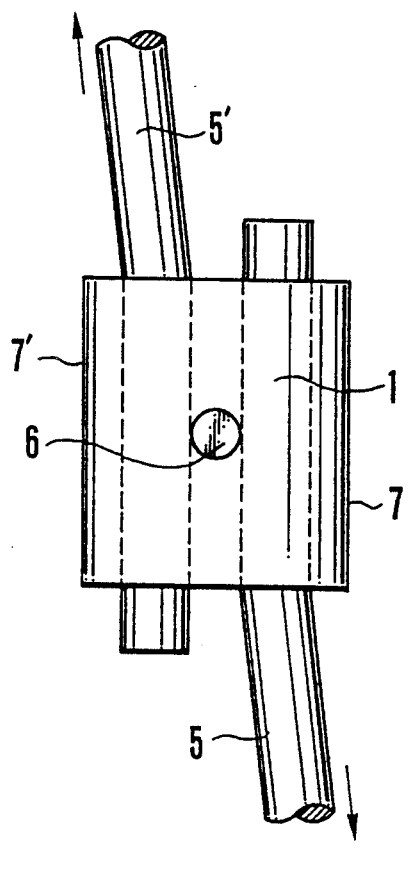
FIG. 4 is a drawing illustrating the condition when tensile force is applied to the connected reinforcing bars.

The joint for connecting together reinforcing bars of this invention is a joint including a sleeve which is a hollow metallic pipe and has an opening respectively at the two ends and a wedge. The basic structure of the sleeve is the same as that of the above-described conventional joint. The sleeve 1 has nearly oval cross section, as shown in FIG. 1, and the wall thereof includes of a pair of side walls 2 and 2' which are substantially plane walls provided substantially parallel each other at a certain spacing and a pair of curved walls 3 and 3' which are arched with respect to the center of the sleeve and connect the said side walls respectively. Wedge bores 4 and 4' are provided in the respective centers of said side walls 2 and 2'.

Figure 2:
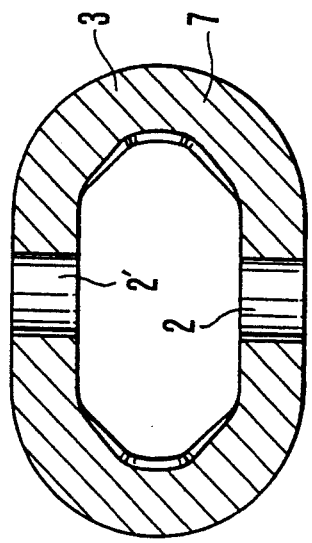
FIG. 2 is a local sectional view at B in FIG. 3, illustrating a typical example of curved wall shape of the sleeve of this invention.

The inner surface of the curved wall is shaped an arc so as to appropriately receive a reinforcing bar. The cross section thereof may be either of circular arc as shown in FIG. 1 (a) or polygonal arc which is shown in FIG. 2 as examples.

An improvement of the sleeve of this invention is, as shown in FIG. 1, providing the concave portions 8 and 8' on the inner surface of the curved wall 3 and 3' of the sleeve at the arc center 7 and 7'. The concave portions 8 and 8' are provided in such a manner that the respective deepest concave portions thereof 9 and 9' are positioned in the respective centers of the arc center in the longitudinal direction. The deepest concave portion is about 0.5 to 1 mm deep. The concave portion may be in any desired shape. A preferable shape is, as shown in FIG. 1 (a), that a portion from the edge of the arc center of the curved wall of the sleeve or from a place close to its slants substantially linearly toward the arc center's deepest concave portion so as to form the concave portion. That is to say, concave portions 8 and 8' are provided on the inner surface of the curved wall 3 and 3' of the sleeve at the center part of the curved wall 3 and 3' in the longitudinal direction at the arc center 7 and 7'.

When a wedge 6 is press-fitted in the sleeve, strong pressure is applied from the wedge to the portion of the reinforcing bar which contacts the wedge in the sleeve, causing the reinforcing bar to tend to bend toward the inside with the wedge as a fulcrum. In the conventional clip joint, the pressure applied from the wedge to the reinforcing bars is transmitted as it is to the arc center of the curved wall, because the said bending property is restrained. In this invention, the concave portion provided receives the deflection due to the bending of the reinforcing bar to some extent. In consequence, a considerable amount of the pressure applied from the wedge to the reinforcing bars is absorbed by the deflection due to the bending of the reinforcing bar. The pressure transmitted to the arc centers of the curved walls is reduced by that portion. This results in no requirement of or great reduction in the reinforcing of the arc center of the curved wall of the sleeve which is required for conventional joints. In addition, the pressure required when a wedge 6 is press-fitted is reduced so that the insertion work and an equipment used for the press-fitting the wedge can be simplified.

Figure 3:
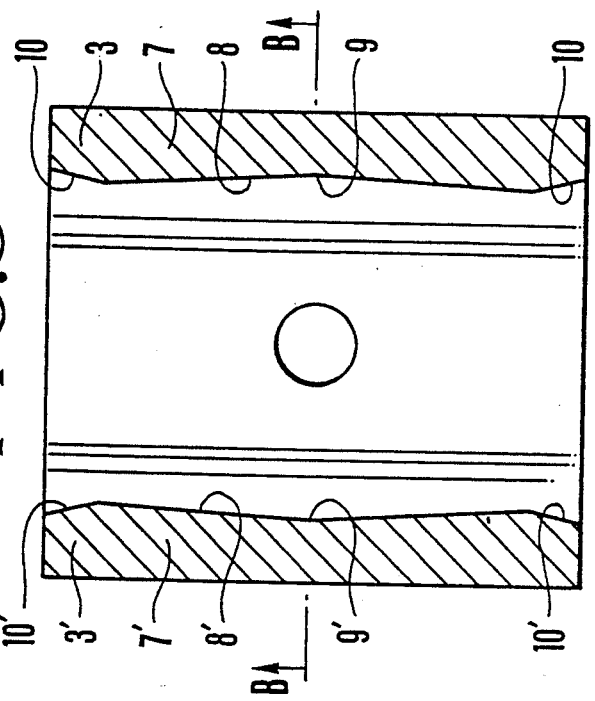
FIG. 3 is a drawing of longitudinal section of the structure of the arc centers of the curved walls.

Another improvement of the sleeve in this invention is, as shown in FIG. 3, providing the tapers 10 and 10' slanting toward the outside at the respective edges of the arc centers 7 and 7' of the sleeve openings of the curved walls 3 and 3'. The tapers greatly reduce the contact pressure between the edge of the arc center of the curved wall and reinforcing bar than that when a conventional joint is used, when tensile force is applied to the connected reinforcing bars. The above-described problem of scraping of reinforcing bar is solved or greatly reduced. In addition, the reinforcing of the opening of the sleeve, which is required for the conventional sleeve, is not required or greatly reduced.

Figure 5:
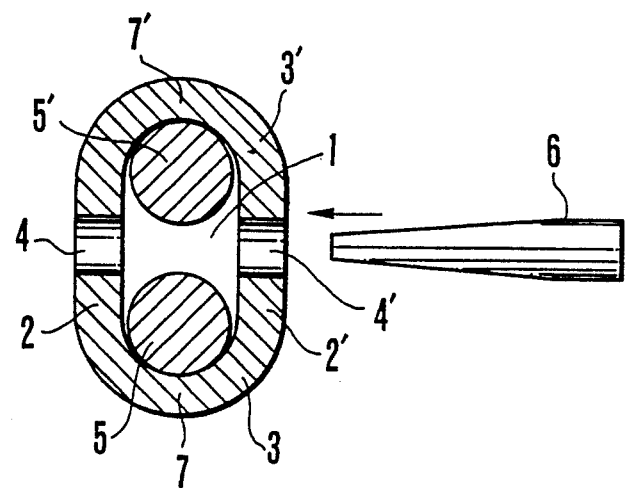
FIG. 5 is a drawing of cross section and FIG. 6 is an exploded perspective view of conventional clip joint.
Figure 6:
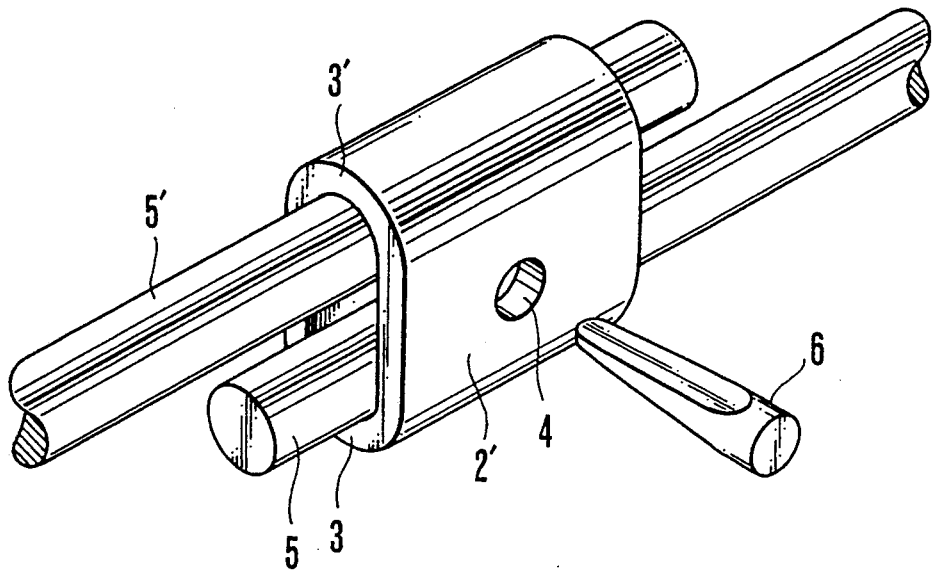

A method for connecting reinforcing bars by using the joint of this invention is the same as that by using a conventional joint which is explained with FIGS. 5 and 6. The connecting end portions of the reinforcing bars are inserted into respective curved portions of the sleeve from the opposite sides thereof, and a wedge is press-fitted into the area between the reinforcing bars from one of the wedge bores to the other. In consequence, one of the reinforcing bars is pressed against the inner surface of the curved wall while the other reinforcing bar is pressed against the other inner surface so that each of the reinforcing bars is connected strongly by the joint. This completes the connection of the reinforcing bars.

Material of the joint is same as that of conventional joint, such as steel, cast iron and carbon steel.

Size of the sleeve of the invention can be changed by the size of reinforcing bars and followings are typical examples of the sleeves.

| | | size of the sleeves (mm) | | | |
|---|---|---|---|---|---|
| d | L | $OD_1$ | $OD_2$ | t | WD |
| 10 | 35 | 30 | 18 | 3 | 10 |
| 13 | 40 | 39 | 25 | 4.5 | 10 |
| 16 | 60 | 50 | 31 | 6 | 14 | d: nominal diameter of deformed reinforcing far
L: Length of sleeve
$OD_1$: longitudinal length of opening of sleeve
$OD_2$: length of minor axis of opening of sleeve
t: thickness of the sleeve at the concavest portion
WD: diameter of wedge

What is claimed is:

1. A joint for reinforcing bars which comprises in combination a sleeve (1) which is a hollow metallic pipe and has an opening at the two opposite ends and a centrally disposed wedge (6); and said sleeve has
    (a) a substantially oval cross-section and includes a pair of side walls (2, 2') which are substantially plane walls provided substantially parallel to each other and are spaced apart, and a pair of curved walls (3, 3') which are arched with respect to the center of the sleeve and connect the side walls respectively;
    (b) wedge bores (4, 4') in the respective centers of the side walls (2, 2') in such a manner as to face each other; and,
    (c) concave portions (8, 8') on the inner surfaces of the curved walls at the middle part of the arc centers (7, 7') of the curved walls (3, 3') in the longitudinal direction in such a manner that the deepest portions of the curve are in the respective centers of the arc centers in the longitudinal direction.

2. A joint for reinforcing bars according to claim 1 in which tapers (10 and 10') slanting toward the outside are provided at the respective edges of the arc centers (7 and 7') of the sleeve openings of the pair of curved walls (3 and 3').

3. A method for connecting reinforcing bars which comprises that the connecting end portions of the reinforcing bars are respectively inserted into the respective curved portions of the sleeve (1) of the joint according to claim 1 from the opposite sides thereof, and a wedge (6) is press-fitted into the area between the reinforcing bars from one of the wedge bores to the other in order that one of the reinforcing bars may be pressed against the inner surface of the curved wall while the other reinforcing bar is pressed against the other inner surface so that each of the reinforcing bars is connected strongly by the joint.

4. A method for connecting reinforcing bars which comprises that the connecting end portions of the reinforcing bars are respectively inserted into the respective curved portions of the sleeve (1) of the joint for reinforcing bars according to claim 2 from the opposite sides thereof, and a wedge 6 is press-fitted into the area between the reinforcing bars from one of the wedge bores to the other in order that one of the reinforcing bars may be pressed against the inner surface of the curved wall while the other reinforcing bar is pressed against the other inner surface so that each of the reinforcing bars is connected strongly by the joint.

* * * * *